United States Patent [19]

Hagita et al.

[11] Patent Number: 4,651,230
[45] Date of Patent: * Mar. 17, 1987

[54] APPARATUS FOR DETECTING AND COMPENSATING DROP-OUTS IN AN AUDIO AND VIDEO SIGNAL

[75] Inventors: Shoji Hagita, Yokohama; Shinji Kakuyama, Higashimurayama, both of Japan

[73] Assignee: Sony Corporation, Tokyo, Japan

[*] Notice: The portion of the term of this patent subsequent to Dec. 25, 2001 has been disclaimed.

[21] Appl. No.: 466,212

[22] Filed: Feb. 14, 1983

[30] Foreign Application Priority Data

Feb. 13, 1982 [JP] Japan .................................. 57-21695

[51] Int. Cl.[4] ........................ H04N 9/491; H04N 5/76; H04N 5/78
[52] U.S. Cl. ................................... 358/314; 358/330; 358/343; 360/38.1
[58] Field of Search ............... 358/144, 310, 314, 328, 358/330, 335, 336, 343; 360/19.1, 30, 38.1

[56] References Cited

U.S. PATENT DOCUMENTS

| 3,893,163 | 7/1975 | Wessels et al. | 358/330 |
| 3,989,893 | 11/1976 | Eisema | 360/38 X |
| 4,012,774 | 3/1977 | Kuniyoshi et al. | 358/314 |
| 4,208,671 | 6/1980 | Ozawa et al. | 358/330 X |
| 4,245,262 | 1/1981 | Ohtsu | 358/314 X |
| 4,361,813 | 11/1982 | Watatani | 360/30 X |
| 4,403,262 | 9/1983 | Ito et al. | 360/19.1 |
| 4,453,186 | 6/1984 | Watatani et al. | 358/330 |
| 4,462,048 | 7/1984 | Ross | 358/336 |
| 4,464,684 | 8/1984 | Kluth | 360/19.1 X |
| 4,476,501 | 10/1984 | Hirota et al. | 360/19.1 |
| 4,490,751 | 12/1984 | Kono et al. | 358/343 X |

FOREIGN PATENT DOCUMENTS

0044285 4/1981 Japan .................................. 358/310
2098376 11/1982 United Kingdom ............... 360/19.1

Primary Examiner—Aristotelis M. Psitos
Attorney, Agent, or Firm—Lewis H. Eslinger; Alvin Sinderbrand

[57] ABSTRACT

Drop-outs are detected and compensated for in an apparatus for reproducing video and audio signals that have been recorded as first and second mixed signals in adjacent first and second parallel tracks, respectively, on a magnetic record medium such as a tape and in which each of the mixed signals is comprised of a video signal mixed with at least one frequency modulated audio signal, in the case of monaural, having a respective carrier frequency. The recorded mixed signals are reproduced by two magnetic heads that scan the adjacent first and second tracks to reproduce alternately the mixed signals recorded thereon, and drop-outs are detected in the reproduced signals. The audio signals are separated from the reproduced mixed signals, frequency demodulated and combined to form a substantially continuous or reconstituted demodulated audio signal. A compensator is provided in the demodulated audio line and is responsive to the detection of drop-outs by a detector therefor to produce a substantially continuous demodulated audio signal, in which drop-outs are compensated. A second dropout compensator is provided for compensating the video signal for dropouts and the second dropout compensator is located in the line carrying the luminance component of the video signal and is responsive to the original drop-out detector output derived from the reproduced signals. The drop-out detector may be responsive to the reproduced mixed signals either prior to combining into a signal or subsequent to such combining. Still further, the drop-out detection may be responsive to drop-outs in the frequency modulated audio signals after the latter have been separated from the reproduced mixed signals.

6 Claims, 9 Drawing Figures

APPARATUS FOR DETECTING AND COMPENSATING DROP-OUTS IN AN AUDIO AND VIDEO SIGNAL

BACKGROUND OF THE INVENTION

1. Field of the Invention

This invention relates generally to apparatus for reproducing video and audio signals, such as may constitute a television signal, that have been recorded on a magnetic medium and, more particularly, is directed to apparatus to compensate for drop-outs occurring at random that have adverse effects on the reproduced signals.

2. Description of the Prior Art

In the video tape recorders, according to the prior art, for recording a color television signal on a magnetic tape, the chrominance and luminance signal components that constitute the color video signal are separated, and the carrier frequency of the chrominance signal component is converted to a low value relative to the higher carrier frequency that the luminance component frequency modulates, whereupon the frequency-converted chrominance signal component and the high side band of the frequency-modulated luminance signal component are mixed or combined to form a composite color video signal that is recorded on a magnetic tape in successive, parallel record tracks extending obliquely in respect to the longitudinal or running direction of the magnetic tape. In such existing system for recording a color television signal, the audio signal is recorded on the magnetic tape in separate record tracks that extend in the longitudinal direction, that is, the running direction of the magnetic tape.

In the above described recording system of the prior art, the oblique or slanted tracks that are skewed relative to the tape, in which the composite color video signal made up of the frequency-converted chrominance signal component and the frequency-modulated luminance signal component is recorded, are formed by first and second substantially diametrically opposed rotary magnetic heads both supplied with the composite color video signal. The magnetic heads alternately scan the magnetic tape along a path at an angle to the longitudinal direction in which the tape is transported. In order to increase the recording density of the color video signal on the tape, and thereby increase the duration of the recording, it has been known to restrict the speed at which the magnetic tape is transported so that the successive slanted tracks scanned by the rotary magnetic heads will be more closely or immediately adjacent each other, that is, so that the spaces or so-called guard bands between the adjacent slanted tracks will be eliminated. Nevertheless, in such case, the problem of "cross talk" arises in the reproduction or playback mode of the apparatus. In other words, during reproducing or playback of these closely arranged tracks, a transducer or head scanning one of the slanted tracks for reproducing the composite color video signal recorded therein will also pick up or reproduce signals from the next adjacent tracks, such signals being known as cross talk.

This problem of cross talk has been substantially solved, at least in respect to the relatively high frequency frequency-modulated luminance signal component of the recorded composite color video signal, by providing the first and second rotary magnetic heads with different azimuth angles so that the composite color video signal will be recorded in each slanted track by a magnetic head having an azimuth angle different from the azimuth angle of the head with which the composite color video signal is recorded in the next adjacent track. Subsequently during reproducing or playback, each slanted track is scanned by the rotary magnetic head having the corresponding azimuth angle, with the result that a substantial and beneficial azimuth loss is experienced in the relatively high frequency components of the cross talk derived from the adjacent tracks. Thus, the cross talk in respect to the frequency-modulated luminance signal component is substantially suppressed.

Nevertheless, the azimuth loss effect is rather poor in respect to the low frequency band of the cross talk, that is, in respect to the frequency-converted chrominance signal component, so that other measures need be taken to eliminate or minimize the low-frequency component of the cross talk. As disclosed in detail in U.S. Pat. No. 4,007,482, issued Feb. 8, 1977, and having a common assignee herewith, cross talk in respect to the frequency-converted chrominance signal situated in a relatively low-frequency band is substantially eliminated by recording the chrominance signal component with different first and second carriers in the adjacent tracks, respectively. These first and second carriers, which have been modulated by the chrominance signal component and recorded in adjacent tracks, respectively, may be distinguished from each other by their respective frequency and/or polarity characteristics so that, upon reproduction of the signal recorded in a particular track, the low frequency component of the cross talk from the tracks next to it can be suppressed or eliminated by reason of the different frequency, and/or polarity, or phase characteristics of the respective carriers.

More specifically, as disclosed in the above-identified U.S. patent, the chrominance signal component of the color video signal to be recorded may be frequency-converted so as to produce selectively first and second frequency converted signals which, when considered instantaneously, have the same carrier frequency but which differ from each other in their phase or polarity characteristics. In this case, each of the line areas of one track may have recorded therein a frequency-converted chrominance signal component with a carrier of constant polarity, while in the next adjacent tracks the carrier of the frequency-converted chrominance signal component recorded therein reverses its polarity for successive line intervals. Such pattern of recording ensures that, during playback or reproduction, cross-talk effects can be minimized or eliminated.

When high density recording of the color video signal in successive slant tracks on the tape is effected as described above, the rotational speed of the rotary magnetic heads is relied upon to provide the desired relatively high speed in respect to the magnetic tape for ensuring high quality recording of the color video signal in the slanted or skewed tracks. Nevertheless, in achieving the high density recording of the color video signal the transport speed of the magnetic tape is necessarily quite low, thus, the relative velocity between the magnetic tape and the fixed heads, which record the audio signals in the respective audio tracks, is also quite low, with the result that the quality of the audio recording is adversely affected.

It has been proposed that the audio signals be frequency modulated and then mixed with the composite color video signal to provide a mixed or combined signal supplied to the rotary magnetic heads for recording the combined signal in the slanted tracks. It has also been proposed that the video and audio signal recording apparatus comprise frequency modulating means for modulating first and second carriers by a first audio signal to be recorded, for example, by a stereophonic left signal, thereby providing first and second frequency-modulated audio signals, respectively, and for modulating third and fourth carriers by a second audio signal to be recorded, by a stereophonic right signal, thereby providing third and fourth frequency-modulated audio signals, respectively. These first, second, third, and fourth carriers would all have different frequencies. The proposed apparatus also includes a first mixing means for mixing, with the video signal, two of the frequency-modulated FM audio signals that represent the first and second audio signals to be recorded, respectively, and thereby providing a first mixed audio and video signal, and also second mixing means for mixing the other two of the frequency-modulated audio signals with the video signal, thereby providing a second mixed audio and video signal. This system further teaches that the first and second magnetic heads have different azimuth angles and receive the first and second mixed audio and video signals, respectively, for recording the first and second mixed signals in respective record tracks that are adjacent each other on the magnetic tape.

The respective frequencies of the first, second, third, and fourth carriers of the frequency modulated audio signals, as described above, can have successively increasing values, wherein the first frequency-modulated audio signals mixed with the video signal in the first mixing means for providing the first mixed audio and video signal are the first and third frequency-modulated audio signals, and the other two frequency-modulated audio signals mixed with the video signal to provide the second mixed audio and video signal are the second and fourth frequency-modulated audio signals.

When reproducing video and audio signals recorded as first and second mixed signals, as described above, with different azimuth angles in adjacent parallel tracks on a magnetic record medium, the adjacent tracks are scanned by first and second magnetic heads having corresponding azimuth angles so as to reproduce alternately the first and second mixed signals. The reproduced signals are then separated into the respective frequency-modulated audio signals from the reproduced first and second mixed signals, and the frequency-modulated audio signals that have been separated from the first and second mixed signals are frequency demodulated, thereby to obtain respective alternately reproduced demodulated portions of the first and second audio signals. These alternately reproduced signals are then sequentially combined to provide substantially continuous demodulated first and second audio signals.

Thus, it is known to have high density recording of mixed audio and video signals in a fashion such that adverse effects of cross-talk between adjacent tracks are substantially eliminated. Nevertheless, the ability to accomplish high-density recording without deleterious cross talk accentuates another problem that was present all along but was overshadowed by the cross-talk problem, that is, the problem of drop-outs. These drop-outs occur at random and involve an absence of signal at a particular instance during reproduction typically related to mistracking caused by tape/head misalignment or by a stretched magnetic tape, or by particles of dirt or foreign material on the head or on the magnetic tape. These causes lead to the randomness of the drop-outs. Drop-outs adversely affect the audio as well as the video, and are manifested by a brief absence of sound in the audio signal and by a white line in the visual display in the case of the video signal. The ever increasing ability to raise the information density on the magnetic tape has made the random drop-out problem all the more important and one that requires a realistic and practical solution.

OBJECTS AND SUMMARY OF THE INVENTION

Accordingly, it is an object of this invention to provide apparatus for reproducing video and audio signals recorded in a high density manner on a magnetic record medium, wherein adverse effects of drop-outs occurring at random are substantially compensated for.

More specifically, it is an object of this invention to provide an apparatus for reproducing video and audio signals recorded as first and second mixed signals in adjacent first and second parallel tracks, respectively, on a magnetic record medium and in which each of the mixed signals is comprised of a video signal and at least one frequency-modulated audio signal, having a respective carrier frequency, and wherein a drop-out compensating circuit is provided that is responsive to the prior detection of a drop-out to compensate for the respective drop-out in the demodulated audio signal.

It is still another object of this invention to provide an apparatus for reproducing video and audio signals recorded as first and second mixed signals in adjacent first and second parallel tracks, respectively, on a magnetic record medium in which the mixed signals are comprised of a video signal mixed with at least one frequency-modulated audio signal and to provide means for compensating for drop-outs in the video signal once it is separated from the audio signal.

It is a still further object of this invention to provide an apparatus for reproducing video and audio signals recorded as first and second mixed signals in adjacent first and second parallel tracks, respectively, on a magnetic record medium in which a first audio signal represents a stereophonic left signal and a second audio signal represents a stereophonic right signal, wherein the first audio to be recorded was derived by modulating first and second carriers, thereby providing first and second frequency-modulated audio signals and the second audio signal was derived by modulating third and fourth carriers thereby providing third and fourth frequency-modulated audio signals, and in which the first mixed signals is made up of a video signal mixed with two of the frequency-modulated audio signals, which represent the first and second audio signals to be recorded, and the second mixed signal is made up of a video signal mixed with the other two frequency-modulated audio signals, wherein the adverse effects of drop-outs are compensated for in both the left stereophonic signal and the right stereophonic signal, following separation from the mixed signals and frequency demodulation.

The present invention teaches that upon reproducing video and audio signals recorded on a magnetic record medium as first and second mixed signals in adjacent first and second parallel tracks, respectively, and in which the mixed signals are comprised of a video signal mixed with an audio signal, random drop-outs can be detected in the reproduced signals and compensated for in the separated and demodulated audio signals by use of a drop-out compensator responsive to the detection of a drop-out. The invention also teaches the use of a drop-out compensator in the video signal once it has been separated from the reproduced first and second mixed signals and, in keeping with the known predominance of importance of the luminance signal in a color video signal, the invention teaches the use of a drop-out compensator located in the luminance component line of the video signal and being responsive to the prior detection of a drop-out.

Detection of the drop-outs must be performed in relation to the two reproduced signals and a separate drop-out detector can be associated with each of the mixed signals or a single drop-out detector can be utilized following the combining of the reproduced first and second signals, such as might occur when combining the two signals for subsequent video processing. When using two drop-out detectors the outputs therefrom may be fed to a logical OR gate, so that a drop-out detected in either of the first or second mixed signals can be compensated for. Similarly, when the audio signal is a stereophonic signal, then an individual drop-out compensator is utilized in each of the two stereophonic audio signal channels, both drop-out compensators being under control of the drop-out detector described above. Drop-out detection may also be accomplished in the luminance component of the video signal, once the first and second mixed signals have has been combined, the video signal separated from the audio signal, and the chrominance component separated from the composite video. In such embodiment, the drop-out compensator can be as described above.

The above, and other objects, features, and advantages of the present invention, will be apparent from the following detailed description of an illustrative embodiment that is to be read in conjunction with the accompanying drawings, in which the same reference numerals identify the corresponding elements and parts in the several views.

DESCRIPTION OF A PREFERRED EMBODIMENT

Figure 1:
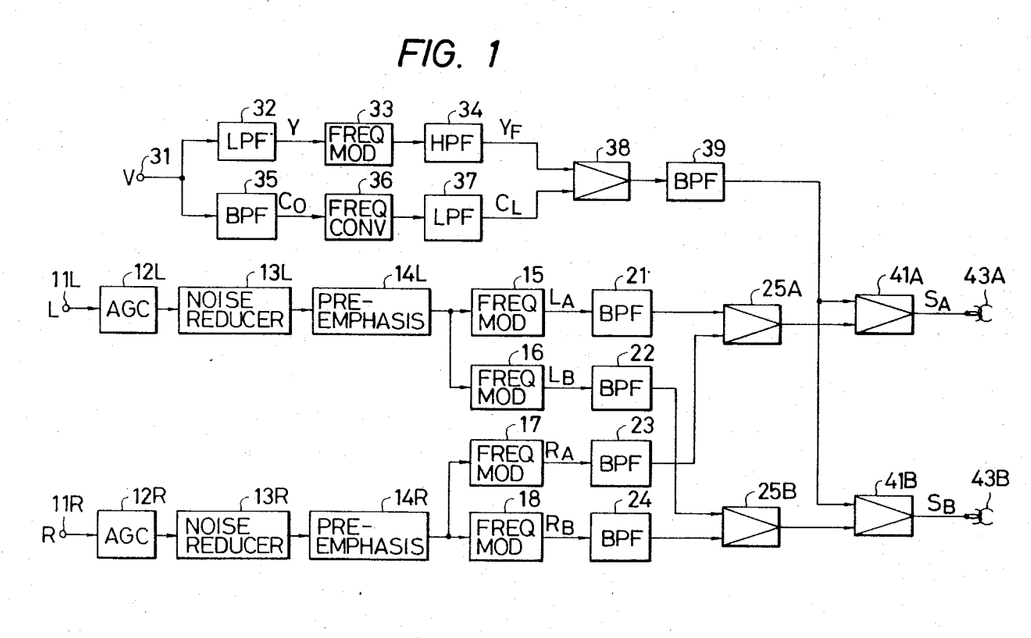
FIG. 1 is a schematic block diagram illustrating a video and audio signal recording apparatus for recording signals on a record medium to be reproduced by the present invention.

Referring to the drawings in detail and, initially to FIG. 1 thereof, it will be seen that a video and audio signal recording apparatus has audio signal input terminals 11L and 11R to which are supplied first and second audio signals, for example, a left channel signal L and a right channel signal R of a stereophonic audio signal. The left channel signal L is supplied from terminal 11 through automatic gain control amplifying circuit 12L, noise reduction circuit 13L, and pre-emphasis circuit 14L, in succession, to first and second frequency modulators 15 and 16. Similarly, the right channel signal R is supplied from terminal 11R through automatic gain control amplifying circuit 12R, noise reduction circuit 13R, and pre-emphasis circuit 14R, in succession, to third and fourth frequency modulators 17 and 18.

First frequency modulator 15 frequency modulates a carrier having a frequency $f_1$, for example, of 1.325 MHz, by the left channel signal L to provide a frequency shift or deviation of the carrier of about 100 to 150 kHz, and to provide at the output of frequency modulator 15 a frequency-modulated left channel signal or first FM audio signal $L_A$. Second frequency modulator 16 similarly frequency-modulates, by means of the left channel signal L, a carrier having a frequency $f_2$, for example, of 1.475 MHz, which is higher than the frequency $f_1$ so as to provide at the output of frequency modulator 16 another frequency-modulated left channel signal, or second FM audio signal $L_B$, having the same frequency-shift width or deviation as the first FM audio signal $L_A$, that is, a frequency deviation of about 100 to 150 kHz, but about a different central frequency. Third and fourth frequency modulators 17 and 18 employ the right channel signal R to frequency modulate a carrier having a frequency $f_3$, for example, of 1.625 MHz, higher than frequency $f_2$, and a carrier having a frequency $f_4$, for example, of 1.775 MHz, higher than frequency $f_3$. Frequency modulators 17 and 18 also provide a frequency-shift width or deviation of their respective carriers of about 100 to 150 kHz in response to the modulating right channel signal R, and provide at their outputs frequency-modulated right channel signals $R_A$ and $R_B$, respectively hereinafter referred to as third and fourth FM audio signals, which have frequency-shift or deviation bands different from each other and also different from the frequency-shift or deviation bands of the first and second audio signals $L_A$ and $L_B$, respectively.

Figure 2:
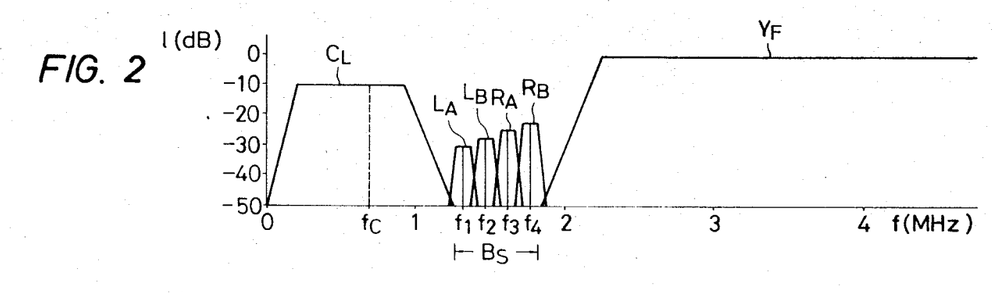
FIG. 2 is a diagram showing the frequency spectrum of the frequency-modulated audio signals, as might be produced by the apparatus of FIG. 1, together with the chrominance and luminance components of a video signal, to which reference will be made in explaining various operations of the apparatus of FIG. 1.

The first and second or left FM audio signals $L_A$ and $L_B$ and the third and fourth or right FM audio signals $R_A$ and $R_B$ are passed from modulators 15, 16, 17, and 18 through corresponding band pass filters 21, 22, 23, and 24, respectively. The levels of the FM audio signals $L_A$, $L_B$, $R_A$, and $R_B$ are suitably adjusted to have successively increased values, as shown in FIG. 2, in which the abscissa represents the frequency f and the ordinate represents the levels of the frequency-modulated audio signals in decibels. Upon examining FIG. 2, it will be apparent that the signals $L_A$, $L_B$, $R_A$, and $R_B$ are sequentially arranged with the same difference or interval between their respective central frequencies and with the respective frequency shift bands or deviation ranges of the adjacent frequency-modulated audio signals being very close to each other or even slightly overlapping, so that the entire frequency band encompassing the frequency modulated audio signals $L_A$, $L_B$, $R_A$, and $R_B$ is relatively narrow in relation to the frequency bands of the video signal.

Referring once again to FIG. 1, the left FM signal $L_A$, representing the first frequency-modulated audio signal from band-pass filter 21, and the right FM signal $R_{A'}$, representing the third FM audio signal from band pass filter 23, are supplied to mixing amplifier 25A, while the left FM signal $L_B$ from band pass filter 22 and the right FM signal $R_B$ from band pass filter 24 are supplied to mixing amplifier 25B. The output of mixing amplifier 25A, that is, the first FM audio signal $L_A$ combined with the third FM audio signal $R_A$, is applied to subsequent mixing amplifier 41A for mixing with the video signal, as will be described hereinafter. Similarly, the mixed output of mixing amplifier 25B that is, the second FM audio signal $L_B$ combined with the fourth FM audio signal $R_B$, is supplied to mixing amplifier 41B that also has the video signal applied thereto. The video signals applied to mixing amplifiers 41A and 41B have both the frequency-modulated luminance signal combined with the frequency-converted chrominance signal to form what is conventionally known as a composite color video signal.

The composite color video signal formed of the frequency-modulated luminance signal and the frequency-converted chrominance signal may be provided by a simplified video signal processing circuit as shown in FIG. 1, including an input terminal 31 that receives a color video signal V containing both luminance and chrominance components. Low pass filter 32 receives the color video signal V from terminal 31 and separates the luminance component Y from the composite signal. The luminance component is then passed through a frequency modulator in which a carrier with a selected central frequency is frequency modulated by the luminance component Y to provide the frequency-modulated luminance component that is then passed through high pass filter 34 and fed to an input of mixing amplifier 38. The other input of mixing amplifier 38 is the chrominance component $C_L$ that is also derived from the composite video signal appearing at terminal 31. Specifically, the color video signal V applied to terminal 31 is fed to band pass filter 35 that separates the chrominance component $C_O$ from the color video signal and passes the chrominance component through frequency converter 36 in which the chrominance component is converted to a frequency band lower than that of the frequency modulated audio signals applied to mixing amplifiers 41A and 41B. The resulting frequency-converted chrominance component is supplied through a low pass filter 37 to the other input of mixing amplifier 38 where it is mixed with the frequency-modulated luminance component $Y_F$. The output of mixing amplifier 38 is fed through band pass filter 39, which acts as a "trap filter" to suppress the frequency band wherein the audio signals would lie, that is, band pass filter 39 passes only that part of the frequency spectrum that would contain the luminance and chrominance signal portions of the video signal. Band pass filter 39 output is then fed to mixing amplifiers 41A and 41B where it is mixed with the outputs of mixing amplifiers 25A and 25B, respectively. Amplifiers 41A and 41B serve not only as the mixing amplifiers but also as recording amplifiers for the recording signal fed to magnetic heads 43A and 43B, respectively, which preferably have different azimuth angles, and, which in a recording mode of the apparatus shown in FIG. 1, are operative to record the mixed signals output from recording amplifiers 41A and 41B in parallel adjacent record tracks on a magnetic record medium.

In a helical scan video tape recorder (VTR), the magnetic record medium is in the form of a magnetic tape, which is guided in a helical path about a substantial portion of the periphery of a guide drum, and magnetic heads 43A and 43B are diametrically opposed and rotatably mounted in relation to the guide drum for movement in a circular path coinciding with the drum periphery. In that case, during operation of the apparatus of FIG. 1 in the recording mode, heads 43A and 43B are rotated to move alternately obliquely across the magnetic tape, as the tape is suitably driven in the longitudinal direction by rotation of the drum. In this fashion a series of slanted tracks are formed on the magnetic tape, such as those represented at FIG. 4. More particularly, head 43A scans alternately slanted or oblique tracks indicated at $T_A$ while head 43B scans the remaining alternating tracks as indicated by $T_B$. Usually, but not necessarily, each of the tracks $T_A$, and $T_B$ has recorded therein the video signal information corresponding to a respective field interval of the video signal. Since heads 43A and 43B have air gaps arranged at substantially different azimuth angles in respect to the plane of rotation of heads 43A and 4B, each of the heads, when recording the respective mixed audio and video signals $S_A$ and $S_B$ in the respective tracks on the tape, effects magnetization of the magnetic domains in the magnetic coating of the tape in what would appear to be, if such domains were visible, a series of parallel lines extending across the respective track and having an orientation corresponding to the azimuth angle of its respective head. As indicated above, in order to achieve a high information density on the tape, the tape speed is selected so that there will be no guard bands or unrecorded areas between adjacent tracks.

Figure 4:
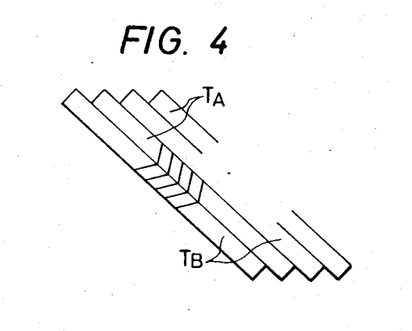
FIG. 4 is a diagramatic view of a section of magnetic tape illustrating the record tracks thereon, in which mixed video and audio signals are recorded by the apparatus of FIG. 1.

In order to permit the alternating slanted or oblique record tracks $T_A$ and $T_B$, as shown in FIG. 4, to be distinguished from one another during reproduction there is typically provided a control signal that is simultaneously recorded on the magnetic tape. The control signal forms no part of the present invention, however, it is noted that the control signal is typically derived from the vertical sync signals that are a part of the composite video signal applied to terminal 31. These control signals based on the vertical sync signals are detected during reproduction and are used to identify the slanted tracks $T_A$ and $T_B$, as to which signals were recorded by rotary heads 43A and 43B respectively.

Referring to FIG. 2, it is seen that the frequency $f_c$ of the color sub-carrier of the frequency-converted chrominance signal $C_L$ has a sufficiently low value, for example, 688 kHz, so that the resulting low frequency band of chrominance signal $C_L$ will be below the band of the first FM audio signal $L_A$ having the above-mentioned central frequency $f_1$ of 1.325 MHz. Additionally, when frequency-converted chrominance signal $C_L$ and frequency-modulated luminance signal $Y_F$ constituting a composite color video signal are to be recorded along with the FM audio signals $L_A$, $L_B$, $R_A$, and $R_B$ in slanted tracks $T_A$ and $T_B$, respectively, the central frequency of the carrier to be modulated by the luminance component $Y_F$ in frequency modulator 33 of FIG. 1, is selected so that in the resulting frequency-modulated luminance signal $Y_F$, the sync signal of the luminance component corresponds to a frequency which is substantially higher than the central frequency $f_4$ of the fourth audio signal $R_B$, while the maximum amplitude of the luminance component corresponds to a frequency that is higher than the frequency of the sync signal of the luminance component. In examining FIG. 2, it will be noted that the value of the chrominance sub-carrier frequency $f_c$ and the relatively higher frequency of the frequency modulated luminance signal $Y_F$, the resulting composite color video signal to be recorded in tracks $T_A$ and $T_B$, has a space or blank in its spectrum between the chrominance signal and the luminance signal sufficient to accommodate all four of the FM audio signals $L_A$, $L_B$, $R_A$, and $R_B$.

As also will be noted from FIG. 2, the amplitude level of the frequency-converted chrominance signal $C_L$ is selected to be larger than the levels of all of the FM audio signals $L_A$, $L_B$, $R_A$, and $R_B$, and the amplitude level of the frequency modulated luminance signal $Y_F$ is selected to be larger than the amplitude level of the chrominance signal $C_L$. Additionally, it will be appreciated that the four FM audio signals are located close to one another in the space or gap between the bands of the frequency-converted chrominance signal $C_L$ and the frequency-modulated luminance signal $Y_F$, to minimize the space needed between the chrominance and luminance signals of the composite video signal to accommodate the four FM audio signals $L_A$, $L_B$, $R_A$, and $R_B$.

Figure 3:
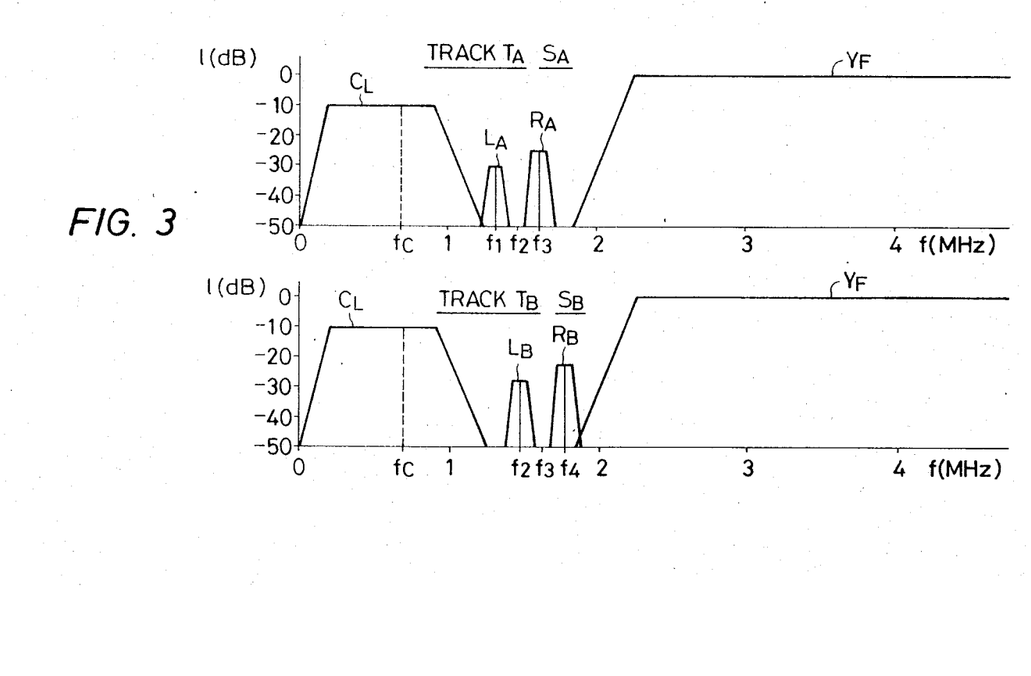
FIG. 3 contains upper and lower diagrams, showing the frequency spectra of mixed signals that are recorded in parallel adjacent tracks, respectively, by the apparatus of FIG. 1.

FIG. 3 shows the spectrum of the signal at $S_A$ as applied to recording head 43A. Specifically, it is seen that only the first FM audio signal $L_A$ and the third FM audio signal $R_A$ are present in the space that has been intentionally left between the chrominance signal $C_L$ and the luminance signal $Y_F$. Similarly, FIG. 3 shows the signal $S_B$ produced by mixing and recording amplifier 41B as applied to recording head 43B and includes only the second FM audio signal $L_B$ and the fourth FM audio signal $R_B$ arranged in the space between the chrominance signal $C_L$ and the luminance signal $Y_F$.

The manner in which the signals recorded in accordance with the apparatus of FIG. 1 are reproduced will be described with reference to FIG. 5 in which a reproducing apparatus is shown to include rotary magnetic heads 43A and 43B that are operative to scan alternately the slanted tracks $T_A$ and $T_B$ formed on the magnetic tape by apparatus similar to that disclosed in FIG. 1. The movements of rotary heads 43A and 43B are suitably controlled by a known servo system (not shown), so that, during one field, head 43A scans a slanted track $T_A$ and, during the next field, the other rotary magnetic head 43B scans the adjacent slanted track $T_B$, thus, head 43A mainly reproduces the first mixed signal $S_A$, from the scanned track $T_A$ with the frequency spectrum shown in the upper portion of FIG. 3, and the second mixed signal $S_B$ having the frequency spectrum shown in the lower portion of FIG. 3 is mixed therewith only as a cross talk component from the adjacent tracks $T_B$. On the other hand, magnetic head 43B mainly reproduces the second mixed signal $S_B$ from the track $T_B$ being scanned and having the frequency spectrum of the lower portion of FIG. 3, while the first mixed signal $S_A$ is mixed therewith only as a cross talk component from the adjacent tracks $T_B$.

The outputs from rotary magnetic heads 43A and 43B are supplied, respectively, through reproducing amplifiers 44A and 44B to band pass filters 51 and 53 respectively, that pass therethrough the left FM signal $L_A$ and the right FM signal $R_A$. Although the left FM signal $L_A$ and the right FM signal Rhd A in the output from head 43A are reproduced from the same slant track $T_B$, the frequency bands of such signals $L_A$ and $R_A$ are spaced apart from each other, that is, they are not immediately adjacent, as is seen from the upper portion of FIG. 3, so that such FM audio signals $L_A$ and $R_A$ can be satisfactorily separated from each other by band pass filters 51 and 53. Thus, band pass filters 51 and 53 deliver the left FM signal $L_A$ and the right FM signal $R_A$, respectively, without mixing therewith any substantial cross talk component of the other. Similarly, the output of head 43B as obtained from reproducing amplifier 44B is supplied to band pass filters 52 and 54 which permit the left FM signal $L_B$ and the right FM signal $R_B$, respectively, to pass therethrough. Although such FM audio signals $L_B$ and $R_B$ in the output from head 43B are also reproduced from the same slanted track $T_A$, their frequency bands are spaced apart from each other, as seen in the lower portion of FIG. 3, and such signals can be effectively separated from each other by band pass filters 52 and 54. Thus, band pass filters 52 and 54 provide, at their outputs, the left FM signal $L_B$ and the right FM signal $R_B$, respectively, with each such signal being essentially free of any cross talk component from the other.

The left FM signals $L_A$ and $L_B$ and the right FM signals $R_A$ and $R_B$ obtained from band pass filters 51 and 53 and band pass filters 52 and 54, respectively, are supplied through amplitude limiters 55, 56, 57, and 58, respectively, to corresponding FM demodulators 59, 60, 61, and 62. During the reproduction of the fields of the audio signal recorded in slant tracks $T_A$ and $T_B$ the outputs of frequency demodulators 59, 60, 61, and 62 are fed to low pass filters 63, 64, 65, and 66, respectively, which are each designed to pass only the audio signal band. The purpose of low pass filters 68, 69, 70, 71 is to remove from the audio signal supplied thereto any beat noises (inter-signal interference) that may occur in the outputs of frequency demodulators 59, 60, 61, and 62 due to the existence of cross talk components in the signals reproduced by heads 43A and 43B.

In view of the specific selection of the differences between the adjacent carrier frequencies, for example, 150 kHz, and the specific filtering described above portions of the reproduced left channel signal $S_A$, without any components of the right channel signal $S_B$ or any beat noises mixed therewith, are provided at the outputs of low pass filters 63 and 64 in alternating fields of the video signal. Similarly, portions of the reproduced right channel signal $S_B$, without any components of the left channel signal $S_A$ or any beat noise mixed therewith are provided at the outputs of low pass filters 65 and 66 during alternating fields of the reproduced video signal.

The alternating portions of the reproduced left channel signal obtained from low pass filters 63 and 64, as described above, are passed through a switch circuit 67L, which is changed over at each alternating video field period in response to a control signal $S_W$ that is applied to the tape as described hereinabove and is based upon the vertical sync signal, so that a reconstituted, continuously reproduced, left channel signal $S_A$ is obtained at the output of switch 67L. This control signal $S_W$ is essentially characterized as a rectangular pulse wave. Similarly, the alternating portions of the right channel signal obtained from low pass filters 65 and 66 in alternating fields of the video signal are passed through switch circuit 67R under control of the switch control signal $S_W$, so that a reconstituted continuously reproduced, right channel signal $S_B$ is obtained at the output of switch circuit 67R. In prior systems of this kind, the combined signals are passed through de-emphasis circuits 68L and 68R, respectively, which are complementary to pre-emphasis circuits 14L and 14R in the recording apparatus of FIG. 1 and include low pass filters (not shown). The resulting left and right channel audio output signals are then applied to audio output terminals 69L and 69R, respectively.

In order to compensate for the adverse effects of randomly occurring drop-outs, as detected by drop-out detector 76, one embodiment of this invention provides a drop-out compensator in each of the left and right audio channels. Specifically, drop-out compensator 70L is responsive between the output of signal combining switch 67L and the input of de-emphasis circuit 68L and is responsive to the output of drop-out detector 76. Second drop-out compensator 70R is arranged in the right channel between the output of switch 67R and the input of de-emphasis circuit 68R and is also responsive to the output signal from drop-out detector 76. The manner in which drop-out compensators 70L and 70R act to compensate the audio signals for the adverse effects of drop-outs will be explained in detail hereinbelow.

The reproduced signals from the heads 43A and 43B and reproducing amplifiers 44A and 44B, respectively, are combined and processed in video signal processor circuitry in keeping with the video processor of FIG. 1. The two signals corresponding to the alternating slanted tracks are combined in switch 75, which is similar in function to switches 67L and 67R described hereinabove in relation to the audio signals. Switch 75 is controlled by the signal $S_W$, derived from the vertical sync signal, for example, and the composite video signal that is combined by switch 75 is available for video signal processing. Prior to signal processing, however, drop-out detector 76 is connected to the composite video signal. Drop-out detector 76 may be any one of the several known kinds of detectors, and in one embodiment this invention contemplates a drop-out detector wherein the composite video signal is compared with a known reference level signal to detect drop-outs that are manifested by a loss of signal. The reference signal level can be varied to control the sensitivity of drop-out detector 76. The output from drop-out detector 76 is then. fed to drop-out compensating circuits 70L and 70R that, upon receiving the drop-out detection signal, substantially eliminate any adverse effects caused by the detected drop-out in the left and right channels of the audio signals. Drop-out compensators 70L and 70R can operate to maintain a preceding signal level for the period of time that a drop-out is detected. This will render the effects of the drop-out substantially undetectable to the ear of the listener in all but the most extreme cases.

Figure 5:
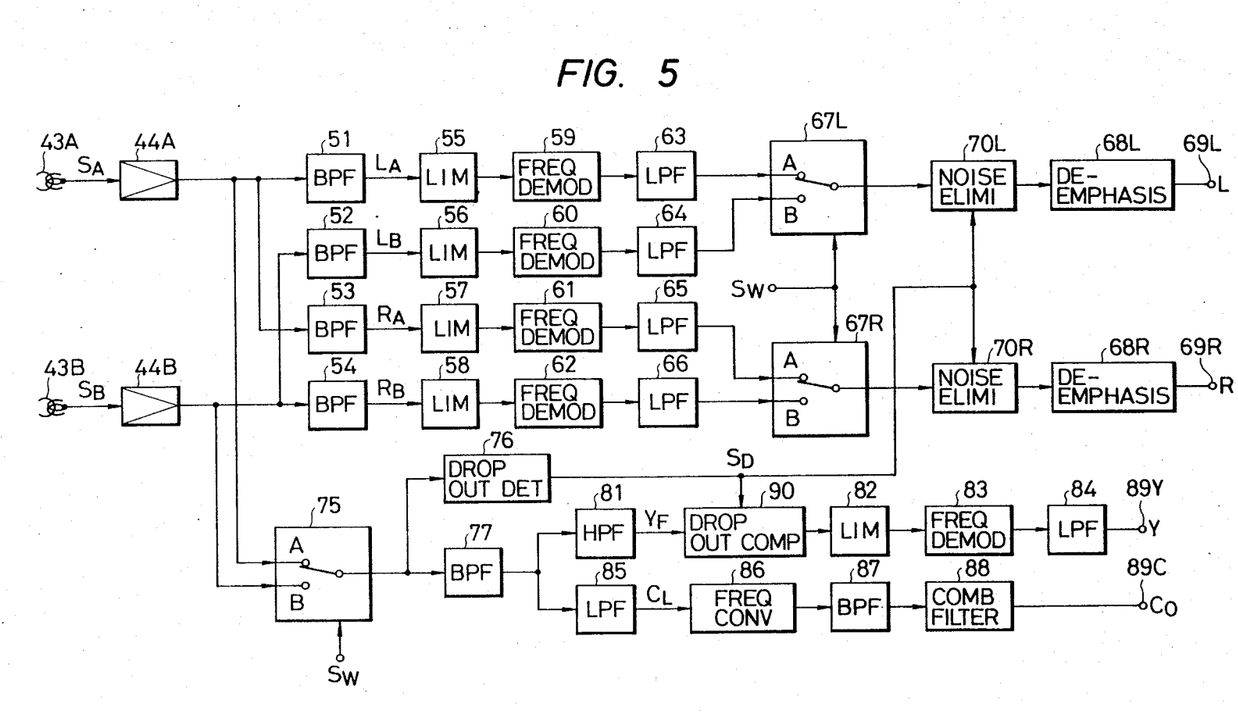
FIG. 5 is a schematic block diagram illustrating a video and audio signal reproducing apparatus according to an embodiment of this invention.
Figure 6:
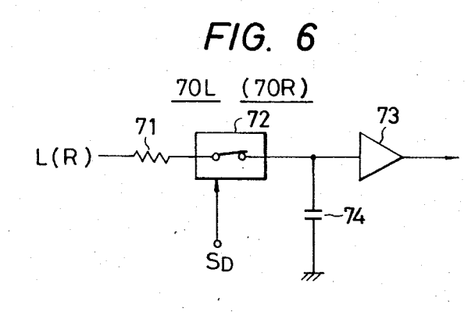
FIG. 6 is a schematic view of a drop-out compensator for use in an audio signal line, as might be used in the embodiment of FIG. 5.

One embodiment of a drop-out compensator, such as shown at 70L and 70R in FIG. 5, suitable for use in the audio channels is shown in FIG. 6. The audio signals, as combined by switches 67L or 67R are fed through resistor 71, through normally closed switch 72, to the input of buffer amplifier 73. A holding capacitor 74 is connected between the audio input signal to buffer amplifier 73 and electrical ground. The charge on holding capacitor 74 will track the audio signal levels as presented to the input of buffer amplifier 73. When a drop-out is detected by detector 76, a drop-out compensator control signal $S_D$ is produced and fed to drop-out compensators 70L and 70R, and, in this embodiment, the compensator control signal $S_D$ causes normally closed switch 72 to open. When switch 72 is opened, the audio signal fed to buffer amplifier 73 is interrupted and the only input to buffer amplifier 73 is derived from the voltage stored in holding capacitor 74 at that specific instant. Capacitor 74 discharges into the input of buffer amplifier 73 and, as will be shown hereinbelow in relation to FIG. 7, maintains the preceding instantaneous signal level substantially constant.

Figure 7:
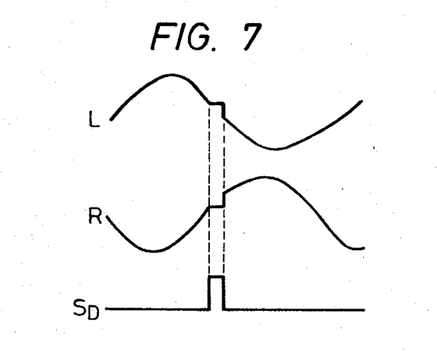
FIG. 7 is a waveform diagram to which reference will be made in explaining the operation of the apparatus of FIG. 5.

The operation of drop-out compensator 70L and 70R is shown by the waveforms in FIG. 7. Specifically, the upper waveform L represents the audio signal out of drop-out compensator 70L, and the middle waveform R represents the audio signal out of drop-out compensator 70R. The lowermost waveform $S_D$ in FIG. 7 represents the compensation control signal from drop-out detector 76. The effects of holding capacitor 74 in maintaining an instantaneous signal level substantially constant are readily seen in the upper two waveforms of FIG. 7. Additionally, as may be seen in FIG. 7, the length of time that a drop-out exists is small in comparison to the period of the audio signals and, thus, by smoothing the audio signals and avoiding discontinuities, the adverse effects of of drop-out in the audio signals are substantially eliminated.

Returning to FIG. 5, the combined first and second mixed signals appearing at the output of switch 75 contain all of the video signal information that was previously recorded on the tape, as described hereinabove in regard to FIG. 1. The video signal information is first separated from the combined first and second mixed signals by band pass filter 77 that has a frequency response similar to a trap filter to remove all audio frequency components from the combined first and second mixed signals. The video signal must then be separated into the luminance and chrominance components, the luminance component is separated from the combined video signals by high pass filter 81 to produce the frequency-modulated luminance component $Y_F$. The frequency modulated luminance component $Y_F$ is then typically amplitude limited in amplitude limiter 82 and then frequency demodulated in frequency demodulator 83. The demodulated luminance component of the video signal is then passed through a low pass filter 84 and made available at terminal 89Y for display. The chrominance component is removed from the combined video signal by low pass filter 85 to form the chrominance component signal $C_L$. Because the chrominance component had been previously down converted in frequency, it must now be converted back up and this is accomplished in frequency converter 86. The frequency-converted chrominance component is then filtered in band pass filter 87. Additionally, as described hereinabove, the chrominance component of the video signal was recorded in a special fashion, specifically, each of the line areas or increments of one track may have recorded therein a frequency converted chrominance signal component with a carrier of constant polarity, whereas in the next adjacent tracks, the carrier of the frequency-converted chrominance signal component recorded therein reverses its polarity for successive line intervals. Such pattern of recording ensures that during playback or reproduction cross talk effects can be minimized or eliminated. During reproduction of the recorded signals, the reproduced signals of two successive line intervals can be added together by means of suitable delay means or by a simple comb filter to cancel out or minimize cross-talk interference signals associated with the desired reproduced signals of the two successive line intervals. The combining comb filter is shown at 88 in FIG. 5 and produces the chrominance signal at output terminal 89C.

Drop-outs can also adversely affect the video signal and, specifically, can adversely affect the luminance portion of the video signal, since it contains the majority of the video signal information, this embodiment of the invention teaches the use of an additional drop-out compensator arranged in the chrominance component line of the video processor. Video drop-out compensator 90 is again responsive to the compensator control signal $S_D$ that initiates drop-out compensating action in audio drop-out compensators 70L and 70R.

Figure 8:
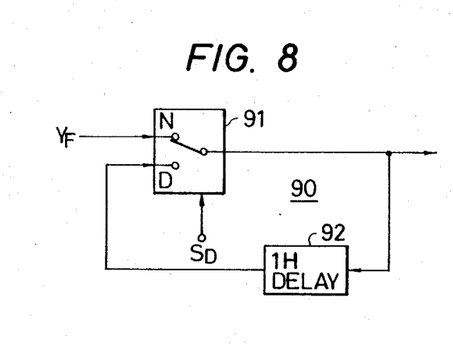
FIG. 8 is a schematic block diagram of a drop-out compensator, as might be used in a video line in the embodiment of FIG. 5.

Drop-out compensator or noise eliminator 90 for use in the luminance component of the video signal is shown in more detail in FIG. 8, wherein the luminance signal $Y_F$ is supplied to a normal terminal N of switch 91 that, in its normal state, provides the input luminance component $Y_F$ to its output. Switch 91 is responsive to the output signal $S_D$ of drop-out detector 76, to switch between the luminance signal $Y_F$ at terminal N and a D input that has connected thereto a delayed feedback of the output switch 91 when the normal input terminal N is connected to the output. More specifically, chrominance signal $Y_F$ output from switch 91, when the N input is connected to the output, is fed back through a one horizontal scan line (1H) delay unit 92 to the delay input D of switch 91. In the operation of video drop-out compensator 90 of FIG. 8. used in the chrominance component line of the video signal, upon drop-out detector 76 detecting a drop-out and providing a control signal $S_D$ that is fed to switch 91, switch 91 moves off its normal position at input N, wherein the modulated luminance component $Y_F$ is fed through switch 91 and to the input of amplitude limiter 82, and switch 91 moves to connect input terminal D to its output. Input D is connected to the feedback signal that comprises the normal output signal having been delayed by the one horizontal frame delay provided by delay unit 92. Amplitude limiter 82 then sees at its input the same scan line that had been fed to it in the preceding scan, thereby eliminating adverse effects caused by a drop-out that typically results in white lines on the video screen.

Figure 9:
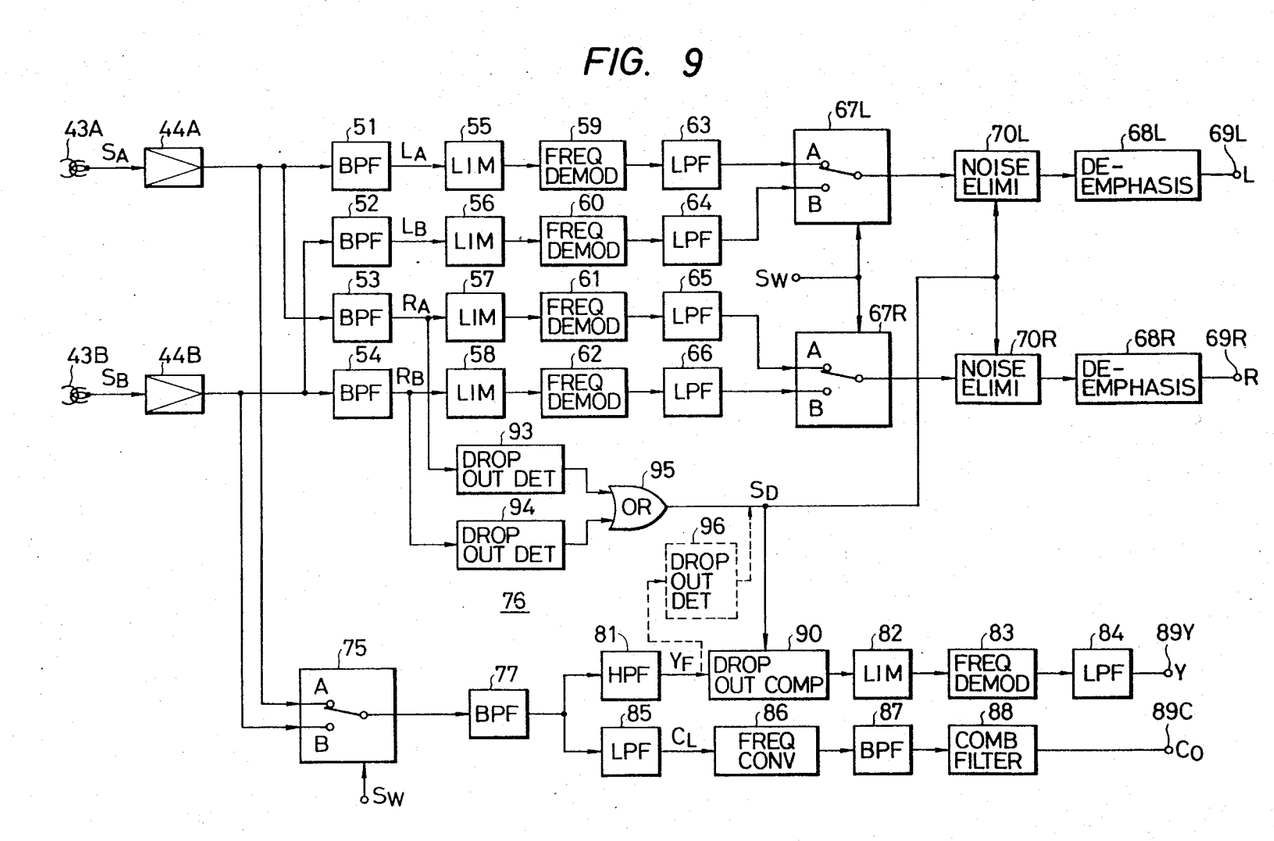
FIG. 9 is a schematic block diagram illustrating a video and audio signal reproducing apparatus according to another embodiment of this invention.

Turning now to FIG. 9, another embodiment of a playback or reproducing apparatus similar to that of FIG. 5 is shown, except that the arrangement in the circuit of the drop-out detector is modified. In the embodiment of FIG. 9, drop-outs are detected by drop-out detector 76 in the frequency-modulated audio signal $R_A$ as separated from the first mixed signal by band pass filter 53, and drop-out detector 93, which can be constructed as described hereinabove is connected to this separated signal. This provides a drop-out detection of only one of the alternating slanted tracks that have been recorded and, thus, it is necessary to detect drop-outs in the other alternating slanted tracks. This detection is accomplished by connecting second drop-out detector 94 in the fourth frequency modulated audio signal $R_B$ as filtered out by band pass filter 54. The outputs from drop-out detectors 93 and 94 are connected to the inputs of logical OR gate 95 that produces the drop-out control signal $S_D$ fed to the audio drop-out compensator 70 located in the luminance component signal $Y_F$ line, as separated by high pass filter 81.

In another alternate embodiment shown in FIG. 9, the drop-out detector may be located in the luminance component signal $Y_F$ line and still serve to detect all drop-outs in both of the alternating slanted tracks. Specifically, after the first and second mixed signals produced by heads 43A and 43B and amplified in amplifiers 44A and 44B, respectively, have been combined by switch 75, and the video portion thereof separated by band pass filter 77, the luminance component $Y_F$ is further separated from the video signal by high pass filter 81. Drop-out detector 96 is connected to the luminance signal $Y_F$, as shown by the dashed lines, to indicate that drop-out detector 96 is not in addition to the other detectors but is an alternate embodiment. The output of drop-out detector 96 then becomes the drop-out control signal $S_D$ that is connected to audio drop-out compensators 70L and 70R and also to drop-out compensator 90 located in the luminance component signal $Y_F$.

Having specifically described an illustrative embodiment of this invention with reference to the accompanying drawings, it is to be understood that the invention is not limited to that precise embodiment, and that various changes and modifications, among which several have been mentioned, may be effected therein by one skilled in the art without departing from the scope or spirit of the invention as defined in the appended claims.

What is claimed is:

1. An apparatus for reproducing video and audio signals recorded as first and second mixed signals in adjacent first and second parallel tracks, respectively, on a magnetic record medium and in which each of said first and second mixed signals includes a video signal mixed with at least one FM audio signal having a respective carrier frequency, in which the video signal includes at least one synchronization signal, comprising:
   first and second magnetic heads scanning said adjacent first and second tracks to reproduce alternately said first and second mixed signals therefrom;
   means for separating said FM audio signals from said reproduced first and second mixed signals and for frequency demodulating the separated signals to form alternately reproduced portions of said at least one audio signal;
   first combining means for sequentially combining said alternately reproduced portions of said at least one audio signal into a reconstituted audio signal in response to said video synchronization signal;
   second combining means for sequentially combining said first and second mixed signals in response to said video synchronization signal to provide a combined, substantially continuous, mixed video and audio signal;
   drop-out detecting means for detecting drop-outs occurring at random in said combined, substantially continuous, mixed video and audio signal; and
   drop-out compensating means responsive to the detection of drop-outs by said drop-out detecting means for compensating for the effects of the respective drop-outs in said reconstituted audio signal.

2. An apparatus for reproducing video and audio signals according to claim 1; in which said video signal has a luminance component and a chrominance component, and further comprising means connected to receive said combined substantially continuous, mixed video and audio signal for separating said luminance and chrominance components from each other, and second drop-out compensating means responsive to the detection of drop-outs by said drop-out detecting means for compensating the respective drop-outs in said luminance component.

3. An apparatus for reproducing video and audio signals according to claim 1; in which there are first, second, third, and fourth of ones said carriers of successively increased frequencies, said first and second carriers being frequency modulated by a left stereophonic audio signal to form first and second of said FM audio signals, said third and fourth carriers being frequency modulated by a right stereophonic audio signal to form third and fourth of said FM audio signals, said first mixed signal being constituted by said first and third FM audio signals mixed with said video signal, and said second mixed signal being constituted by said second and fourth FM audio signals mixed with said video signal; in which said frequency demodulating means includes means receiving said first, second, third, and fourth FM audio signals separated from the reproduced first and second mixed signals for demodulating therefrom respective alternately reproduced portions of said left and right stereophonic audio signals; said first combining means includes first switch means to combine the alternately reproduced audio signal portions demodulated from said first and third FM audio signals into a reconstituted left stereophonic audio signal, and second switch means to combine the alternately produced audio signal portions demodulated from said second and fourth FM audio signals into a reconstituted right stereophonic audio signal; and said drop-out compensating means includes a first drop-out compensator receiving said reconstituted left stereophonic audio signal and responsive to detection of drop-outs by said detecting means for compensating therefor, and a second drop-out compensator receiving said reconstituted right stereophonic audio signal and responsive to detection of drop-outs by said detecting means for compensating therefor.

4. An apparatus for reproducing video and audio signals according to claim 3; further comprising means for separating said video signal from said combined, substantially continuous, mixed video and audio signal produced by said second combining means, in which said video signal has a luminance component and a chrominance component, means for separating said luminance and chrominance components from each other, and a third drop-out compensator responsive to detection of drop-outs by said drop-out detecting means for compensating said drop-outs in the video signal.

5. Apparatus for reproducing video and audio signals according to claim 1; in which said drop-out compensating means is a holding circuit for maintaining an instantaneous preceding signal level constant during the occurrence of a drop-out in response to said drop-out detecting means.

6. An apparatus for reproducing video and audio signals according to claim 1, in which said drop-out means comprises means for comparing said first and second mixed signals with reference signal having a preselected level.

* * * * *